INVENTORS
John J. Tsimbidis
Roger F. Salava
BY
Mueller & Aichele
ATTYS.

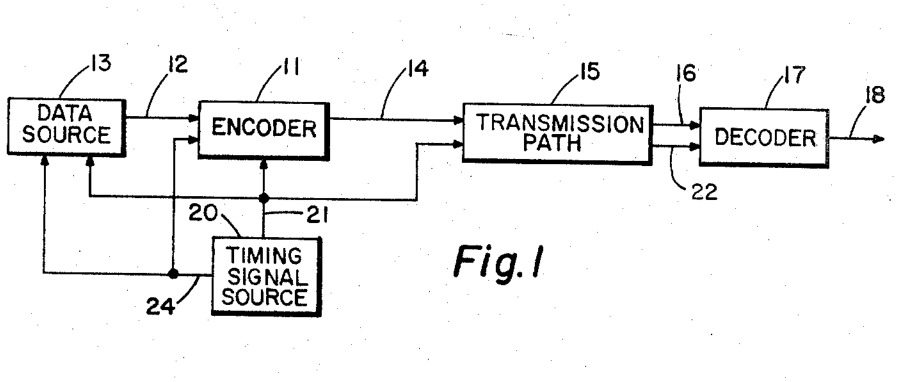
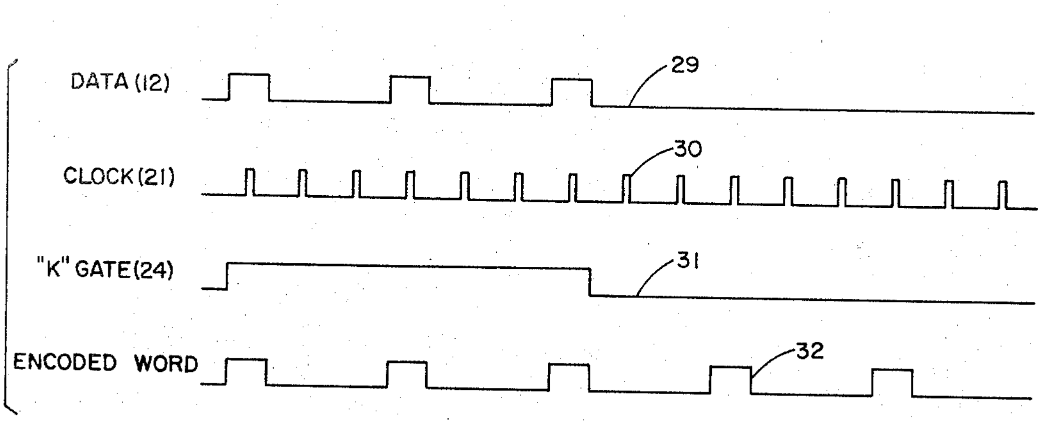
Fig.2
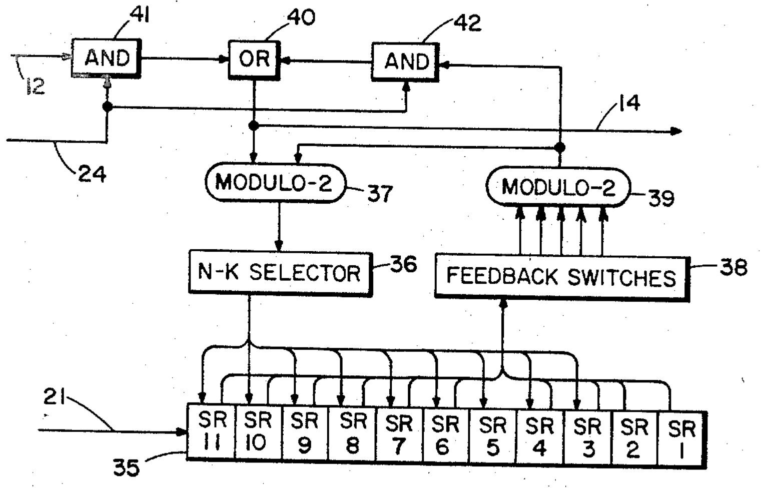
Fig.3
INVENTORS
John J. Tsimbidis
Roger F. Salava
BY
Mueller & Aichele
ATTYS.

United States Patent Office 3,402,390

Patented Sept. 17, 1968

3,402,390

SYSTEM FOR ENCODING AND DECODING INFORMATION WHICH PROVIDES CORRECTION OF RANDOM DOUBLE BIT AND TRIPLE BIT ERRORS

John J. Tsimbidis, Cicero, and Roger F. Salava, Addison, Ill., assignors to Motorola, Inc., Franklin Park, Ill., a corporation of Illinois Filed Mar. 1, 1965, Ser. No. 436,179
15 Claims. (Cl. 340—146.1)

ABSTRACT OF THE DISCLOSURE

Encoder-decoder equipment responsive to input information to produce an encoded word having $k$ information bits and $n—k$ check bits. The decoder has a buffer register and a decode shift register to which received pulse bits are applied, and an error pattern generator for generating single bit, double bit and triple bit error patterns. Signals from the decode register and the error generator are applied to a comparison circuit which controls a conditional inverter for correcting pulses fed out from the buffer register.

This invention relates to a cyclic encoder-decoder system wherein an encoded word signal is generated from an information signal and transmitted to a decoder which operates to detect and correct errors in the transmission of the encoded word signal. The invention relates particularly to a versatile and highly reliable generator in the decoder which operates to generate error patterns required for many cyclic codes, using a small fraction of the circuitry which would otherwise be required.

Cyclic encoder-decoder systems have heretofore been proposed for the transmission of data through VHF or microwave communication links, or through other transmission means wherein the signal to noise conditions are of a marginal character, but wherein the accurate transmission of the data is very important. In such systems, an encoded word of $n$ bits is generated, composed of $k$ information bits representing coefficients of a message polynomial in $x$ of degree less than $k$, and $n—k$ check bits. The check bits represent a remainder after division of the product of $x^{n-k}$ and the message polynomial, by a generator polynomial of degree $n—k$.

An encoded word signal of this type may be generated by means of a shift register having $n—k$ stages and having feedback means for applying feedback signals from certain stages, selected in accordance with the particular generator polynomial which is used. In the decoder, a similar shift register having $n—k$ stages may be used with feedback means substantially the same as the feedback means of the encoder. After application of the encoded word, the register of the decoder produces a certain pattern in response to no errors in the encoded word signal, and other patterns in response to errors in the encoded word signal.

By way of example, in a system operating with a 15, 7 code (15 bits in the encoded word and 7 information bits) the register of the decoder has eight stages and with no errors in the encoded word, it may produce an output pattern of 00000000. However, with an error in the first bit of the encoded word, the register may produce a pattern of 00000001, after application of the encoded word. With an error in the second bit which is transmitted, a pattern of 00000010 may be produced.

With such systems, the $k$ information bits may be stored in a shift register and may be fed through a conditional inverter to an output line after the complete encoded word is fed to the decoder register. In such an arrangement, a detector which may operate in response to the 00000001 pattern, may control the conditional inverter to automatically correct the data.

For single bit error correction, the detection and correction may be performed with the detection of only a 00000001 pattern, again assuming that the 15, 7 code is used. However, the production of random double bit and also triple bit errors is possible in a system operating with marginal signal to noise conditions, and the detection and the correction of only single bit errors may result in an appreciable percentage of uncorrected errors. For both single and double bit error correction, it is necessary to detect a number of patterns equal to the number of bits in the encoded word and for random triple error correction, the number of patterns that must be recognized is considerably greater, being equal to the total combinations of all random two bit errors not including the first bit in error in addition to the single and double error patterns.

To detect such double and triple bit error patterns with conventional circuitry would necessitate a large number of circuits to greatly increase the expense of the system.

This invention was evolved with the object of providing a cyclic encoder-decoder system having improved and simplified means for detecting double and triple random errors.

Another object of the invention is to provide a system which will detect and also correct random double and triple bit errors, while being very versatile and readily adjustable to accommodate desired cyclic codes.

According to this invention, the error patterns required for cyclic code error correction are generated by means of a linear-logic feedback register and such error patterns are applied to a comparison circuit for comparison with the pattern produced by a decode shift register. With this arrangement, it is possible to make the desired detection of errors, using a minimum number of components, while obtaining a high degree of reliability.

According to an important feature of the invention, the feedback register and comparison circuit may be readily used for automatic error correction, by applying the output of the comparison circuit to a conditional inverter between an information bit storage register and an output line.

According to another important feature of the invention, the required error patterns are readily obtained by means of feedback switch means which are set in accordance with the settings of feedback switch means of the encoder and decoder.

A specific feature of the invention is in the provision of an error pattern register operative in reverse order, with respect to the order of operation of the decode shift register.

Further important features of the invention relate to the use of a conditional inverter between stages of the error pattern shift register and to the control of the shift register from counters operated in response to clock pulses applied to the error pattern shift register.

These and other objects, features and advantages of the invention will become more fully apparent from the following detailed description taken in conjunction with the accompanying drawings which illustrate a preferred embodiment and in which:

FIGURE 1 is a schematic block diagram of a cyclic encoder-decoder system according to the invention;

FIGURE 2 is a view illustrating the wave forms of signals produced at various points of the system of FIGURE 1;

FIGURE 3 is a schematic block diagram of an encoder of the system of FIGURE 1.

Figure 4:
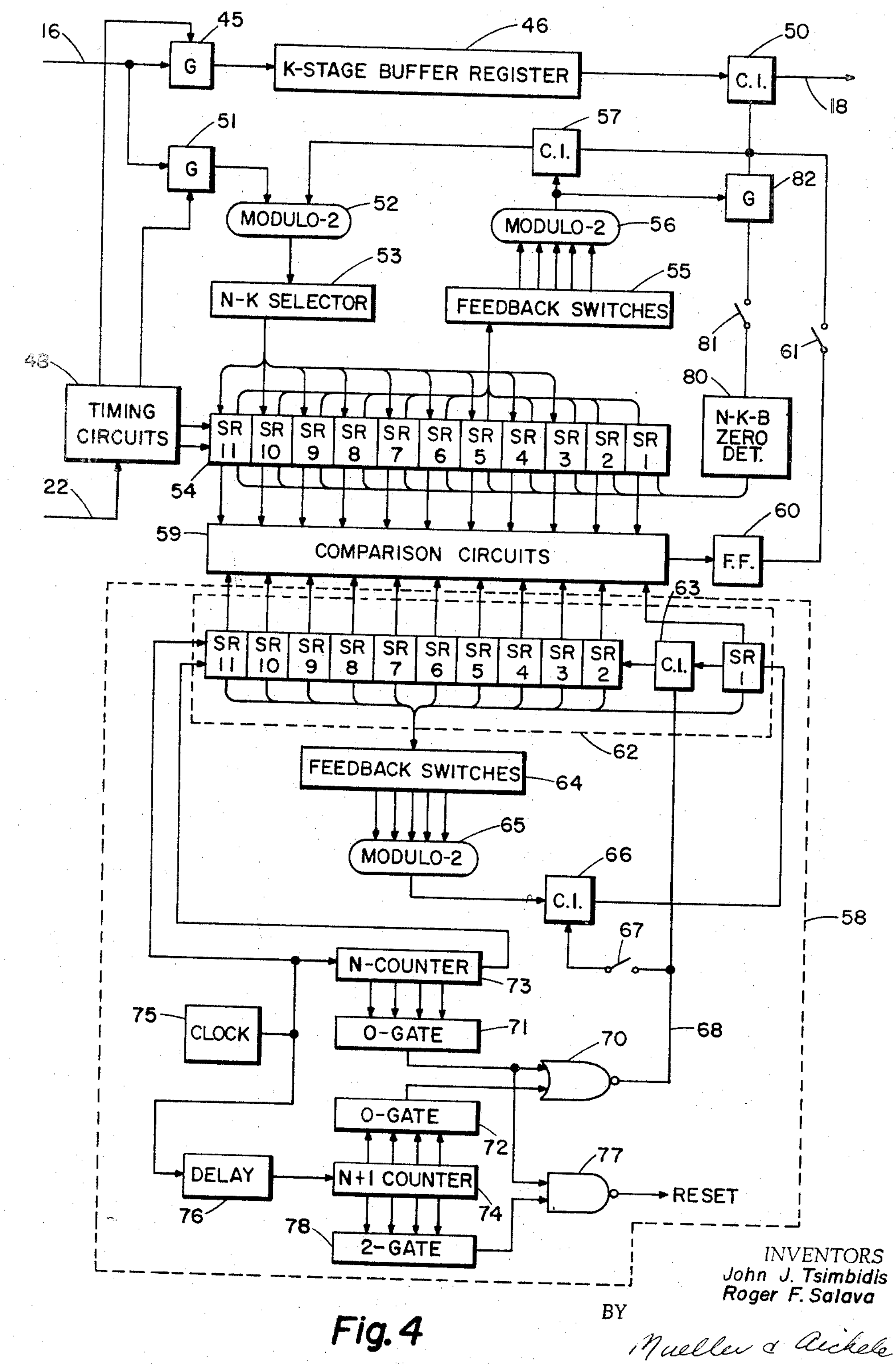
FIGURE 4 is a schematic block diagram of a decoder of the system of FIGURE 1, particularly showing the error pattern generator of this invention.

FIG. 1 generally designates an information transmission system constructed according to the principles of this invention and comprising an encoder 11 to which a data signal is applied on a line 12 from a data source 13. The encoder 11 develops an encoded word signal on a line 14 which is transmitted through a transmission path 15 and applied through a line 16 to a decoder 17, operative to develop a corrected data output signal on a line 18. The transmission path 15 may be a VHF or microwave transmission path but it will be understood that telephone lines or other signal transmission means may be employed.

To control and synchronize the operation of the encoder and decoder and the data source, a timing signal source 20 develops a clock signal on a line 21 which is applied to the encoder 11 and the data source 13, and also through the transmission path 15 and a line 22 to the decoder 17. The source 20 also develops a gate control signal on a line 24 applied to the encoder 11 and the data source 13.

Referring to FIGURE 2, reference numeral 29 indicates the wave form of a typical data signal which may be applied to the encoder 11 on line 12, while reference numeral 30 indicates the wave form of the clock signal on line 21, consisting of a series of pulses. Reference numeral 31 indicates the form of the gate control signal applied on line 24. The illustrated data signal 29 is at a certain level during the first, fourth and seventh of the illustrated clock pulses, while being in a relatively lower level during the second, third, fifth and sixth clock pulses. The signal thus contains seven bits of information and in binary notation is represented by the seven digit number 1001001.

In response to the data signal 29, the encoder 11 produces on the line 14 an encoded word signal having a wave form as indicated by reference numeral 32. This encoded word signal contains fifteen bits of information, the first seven of which are the same as the seven bits of information of the data word signal 29. The last eight bits of information are referred to as check bits and as illustrated, the encoded word signal is in a high level during the tenth and thirteenth of the illustrated clock pulses, while being at a low level during the eighth, ninth, eleventh, twelfth, fourteenth and fifteenth clock pulses, so as to be represented in binary notation by the number 00100100. Thus the complete encoded word signal on line 14 is represented by the binary number 100100100100100.

The above is an illustration of one specific form of cyclic code wherein an encoded word or cyclic code vector of fifteen bits is generated in response to seven data or information bits. The system is also useable with other types of $(n, k)$ cyclic or shortened cyclic codes wherein an encoded word or cyclic code vector of $n$ bits is generated from $k$ information bits. For example, the system has been used with (23, 12), (15, 11), (17, 9), (16, 8), and (7, 4) cyclic codes as well as the illustrated (15, 7) code. In general, with the illustrated system, the code word length, $n$, may take on any integral value from 3 to 23 while the number of information bits, $k$, in each word may range from 1 to 12.

The encoded word signal 32 on line 14 is applied through the transmission path 15 and the line 16 to the decoder 17, along with a clock signal on line 22. In the decoder 17, the encoded word is applied to a first shift register which stores the $k$ information bits of the encoded word and also to a second shift register having a length of $(n-k)$ units and having feed-back connections such as to produce predetermined patterns in response to errors which may occur in the transmission of the bits of the encoded word signal. Upon detection of such errors, the stored word is fed out of the first shift register, while those digits in error are corrected, to generate the corrected data output signal on the line 18.

In the illustrated encoding system, $n-k$ zero coefficients are added on the end of the number or polynomial representing the data or information to be transmitted, thereby multiplying the polynomial by a certain number, and the resulting product is divided by a certain generator polynomial. The resulting remainder is then effectively subtracted from said resulting product to obtain the encoded word polynomial which is evenly divisible by said generator polynomial. In the decoder, the transmitted encoded word polynomial is then divided by the generator polynomial and any remainder represents an error in the transmission. The form of the remainder also indicates the particular bit or bits which are in error so that the decoder can operate to perform appropriate correction operations.

The process of converting $k$ information bits into an encoded word or cyclic code vector of $n$ bits can be described in polynomial ring algebra. The $k$ binary information bits are used to represent the coefficients of a polynomial in $x$ of degree less than $k$ called the message polynomial:

$$q(x)=a_{n-k}+a_{n-k+1}x+\ . \ . \ . \ +a_{n-1}x^{k-1}$$

where the order of serial transmission of the data follows the descending degrees of the polynomial.

The code word polynomial:

$$f(x)=a_0+a_1x+\ . \ . \ . \ +a_{n-k-1}x^{n-k-1} +a_{n-k}x^{n-k}+\ . \ . \ . \ +a_{n-1}x^{n-1}$$

is constructed so that it is evenly divisible by a generator polynomial, $g(x)$, of degree $n-k$. To accomplish this the message polynomial, $q(x)$, is multiplied by $x^{n-k}$:

$$x^{n-k}q(x)=a_{n-k}x^{n-k}+a_{n-k+1}x^{n-k+1}+\ . \ . \ . \ +a_{n-1}x^{n-1}$$

The resulting polynomial has zero coefficients for the first $(n-k)$ lowest order terms.

This polynomial is then divided by the generator polynomial, $g(x)$, and the remainder is found:

$$\frac{x^{n-k}q(x)}{g(x)}=t(x)+\frac{r(x)}{g(x)}$$

Adding the remainder, $r(x)$, to the polynomial $x^{n-k}q(x)$ (modulo 2 addition) assures that a code word polynomial is formed which is evenly divisible by the generator polynomial, $g(x)$:

$$f(x)=x^{n-k}q(x)+r(x)$$

The present invention is concerned primarily with the decoding operation, but the encoder 11 will be first described, to facilitate understanding of the operation of the entire system and of the advantage to and improvement of the overall system, resulting from the decoder of this invention.

FIGURE 3 is a schematic block diagram of the encoder 11 which comprises a N–K shift register 35 having 11 stages connected in cascade and designated as SR–1 through SR–11, SR–1 being the final stage. The input of a selected stage is connected through an N–K selector switch 36 to the output of a first modulo-2 adder 37. For example, when operating with the (15, 7) code, the input of the SR–8 shift register stage is connected through the switch 36 to the output of the modulo-2 adder 37. All of the stages of the shift register 35 are additionally connected to the line 21 for application of clock pulses thereto, which cause a binary digit stored in one stage to be shifted to a subsequent stage.

Outputs of all stages of the shift register 35, except the SR–1 stage, are connected to a feed-back selector switch 38 having five output lines connected to inputs of a second modulo-2 adder 39, having an output connected to one input of the first modulo-2 adder 37. The output of the SR–1 stage is permanently connected to one input of the second modulo-2 adder 39.

A second input of the first modulo-2 adder 37 is connected to the output of an OR gate 40 which is also connected to the encoded word output line 14. One input of the OR gate 40 is connected to the output of an AND gate 41 having an input connected to the input information signal line 12 from the data source 13, while the other input of the OR gate 40 is connected to the output of an AND gate 42 having an input connected to the output of the second modulo-2 adder 39.

The AND gates 41 and 42 are connected to the gate signal line 24 which enables the first AND gate 41 for a "K" time interval, during which *k* information bits are applied from the input line 12 through gates 41 and 40 to the encoded word output line 14 and also to one input of the first modulo-2 adder 37. The second AND gate 42 is then enabled to connect the output of the second modulo-2 adder 39 to the encoded word output line 14.

To illustrate the operation of the encoder 11, it may be assumed that a (15, 7) code is used and that a data signal as indicated by reference numeral 29 in FIGURE 2 is applied, representing the seven digit number 1001001 in binary notation. The N–K selector switch 36 is then set so that $n-k$ or eight stages of the shift register 35 are used, the output of the first modulo-2 adder being connected through the selector switch 36 to the input of the SR–8 stage. It may also be assumed that the selected generator polynomial is so selected that the feed-back selector switch 38 is operative to connect outputs of the SR–5, SR–7, and SR–8 shift register stages to inputs of the second modulo-2 adder 39, an additional input of the second modulo-2 adder 39 being connected to the output of the SR–1 stage, as indicated above.

When the first of the clock pulses illustrated in FIGURE 2 is applied, the data signal 29 is at a high level, representing a "1" as the first bit. A "1" and a "0" are then applied to the first modulo-2 adder 37 and through the selector switch 36, a "1" is entered into the first stage of the N–K register 35 (SR–8 in this example), so that the register contents are changed from 00000000 to 10000000. It may here be noted that each modulo-2 adder produces an output of zero when all inputs are zero or when an even number of ones are applied. When an odd number of ones are applied, each modulo-2 adder produces a one output.

Following the first clock pulse, an odd number of ones are applied to the second modulo-2 adder 39 and it then produces a one output. With a "1" and a "0" being then applied to the first modulo-2 adder 37, it has an odd number of "1" inputs and it produces a "1" output which is applied to the first register stage with the second clock pulse, which also causes shifting of the "1" then stored in the first stage to the second stage. As a result, the register contents become 11000000 in response to the second clock pulse.

With a "1" being stored in both the first and second stages of the register, an even number of ones are applied to the second modulo-2 adder 39 and its output becomes "0." Thus at the time of the third clock pulse, a "0" is applied to each input of the first modulo-2 adder 37, its output is "0," and the third pulse only cause shifting of the "1" signals stored in the first and second stages of the register to the second and third stages, respectively. Thus after the third clock pulse, the register contents become 01100000.

In following through with this operation, it will be found that the register contents following the fourth clock pulse are 00110000, that the register contents following the fifth clock pulse are 10011000, that the register contents following the sixth clock pulse are 01001100, and that the register contents following the seventh clock pulse are 00100110.

At this time, following the seventh clock pulse, the AND gate 41 is closed while the AND gate 42 is open. The inputs to the second modulo-2 adder 39 are then all "0," its output is "0," and when the eighth clock pulse is applied, a "0" is developed on the encoded word output line 14. At the same time, the "1" stored in each of the third, sixth and seventh stages of the shift register (SR–6, SR–3, and SR–2, respectively) are shifted to the fourth, seventh and eighth stages (SR–5, SR–2, and SR–1, respectively), so that the register contents become 00010011.

An even number of ones are then applied to the input of the second modulo-2 adder 39, and it produces a "0" output, while the output of the first modulo-2 adder 37 is also "0." It may be noted that the two inputs to the first modulo-2 adder 37 are always the same in the N–K interval, so that a "0" is always applied to the input stage, and hence no input is applied to the shift register during the generation of the check bits. Accordingly, the ninth clock pulse produces a "0" on the output line 14 and shifts the register 35 so that its contents become 00001001.

A "1" and a "0" are then applied to the second modulo-2 adder 39, and it produces a "1" output so that a "1" output is produced on the encoded word output line 14 in response to the tenth clock pulse.

In following through this operation, it is found that in response to the eleventh clock pulse, the register contents become 00000010; in response to the twelfth clock pulse, the register contents become 00000001; and in response to the thirteenth clock pulse, the register contents become 00000000 to remain 00000000 in response to the fourteenth and fifteenth clock pulses. At the same time, a "0" is produced on the encoded word output line 14 in response to the eleventh clock pulse and also in response to the twelfth clock pulse, while a "1" is produced in response to the thirteenth clock pulse, and a "0" is produced in response to the fourteenth clock pulse and also in response to the fifteenth clock pulse. Accordingly, an encoded word signal of 100100100100100 is produced on the output line 14, with a form as indicated by reference numeral 32 in FIGURE 2.

FIGURE 4 is a schematic block diagram of the decoder 17, wherein the encoded word signal on line 16 is applied through a gate 45 to a K-stage buffer or storage register 46, for storing the data or information portion of the applied encoded word signal. The register 46 has a number of stages equal to the highest number of *k* bits in a signal which might be received and a selector switch for selecting the number of stages in accordance with the number of *k* bits in a particular signal to be received. Clock pulses are applied to the register 46 from a timing circuit 48 to which clock pulses may be applied from line 22. The timer circuit 48 also controls gate circuit 45.

After reception of a complete encoded word signal and after error detection operations, the information bits stored in the K-stage buffer register 46 are fed out through a conditional inverter 50 to the corrected data output line 18. The conditional inverter 50 normally feeds the stored information bits directly to the line 18 but in response to a signal applied from error detection circuitry, it operates to change an applied "1" bit to a "0" bit, or an applied "0" bit to a "1" bit.

The encoded word signal on line 16 is also applied through a gate 51 to one input of a modulo-2 adder 52. Gate 51 is controlled from a N gate signal, applied from the timing circuit 48. The modulo-2 adder 52 has an output connected through an N–K selector switch 53 to a shift register 54 which has 11 stages designated as SR–1 through SR–11; SR–1 being the final stage. A clock signal is applied to the N–K register 54 from the timer circuit 48, in response to the clock signal applied on line 22.

Outputs of all stages of the shift register 54, except the SR–1 stage, are applied to a feed-back switch 55 having five outputs connected to a second modulo-2 adder 56, with the output of the SR–1 stage being directly applied to the second modulo-2 adder 56. The output of the second modulo-2 adder 56 is applied through a conditional inverter 57 to a second input of the first modulo-2 adder 52.

In the decoding operation, the settings of the N–K selector switch 53 and the feed-back switch 55 are the same as the settings of the N–K selector switch 36 and the feed-back switch 38 in the encoder 11, and it is noted that the connections of the first modulo-2 adder 52, the N–K selector switch 53, the N–K register 54, the feed-back switch 55 and the second modulo-2 adder 56 are substantially the same as the connections of the corresponding elements in the encoder 11.

With regard to the operation of the decoder circuit as thus far described, it may be assumed for the purposes of illustration that an encoded word signal having a form as indicated by reference numeral 32 in FIGURE 2 is applied. Since the first seven bits are the same as in the original data signal, they produce the same effect as in the encoder 11, the settings of the N–K selector switch 53 and the feed-back switch 55 being the same as the settings of the corresponding switches 36 and 38 in the encoder. Accordingly, after the seventh clock pulse, the contents of the decoder register 54 are 00100110.

At this time, all inputs to the second modulo-2 adder 56 are zero, the inputs being connected to the SR–1, SR–5, SR–7 and SR–8 stages of the N–K register 54 in this example. With the output of the second modulo-2 adder being "0," and with the eighth bit of the encoded word signal being also "0," the output of the first modulo-2 adder 52 is "0" and in response to the eighth clock pulse, the register contents become 00010011.

Following the eighth clock pulse, an even number of ones are applied to the second modulo-2 adder 56, from the SR–1 and SR–5 stages of the register 54 so that the output of the second modulo-2 adder 56 is zero while the ninth information bit is also zero, producing a zero output from the first modulo-2 adder 52 at the time of the ninth clock pulse. The ninth clock pulse therefore shifts the contents of the register to become 00001001.

The ninth bit of the encoded word is a "1," but a "1" is also developed at the output of the second modulo-2 adder 56, from an odd number of ones applied thereto; a single "1" being applied from the SR–1 stage. Thus the tenth clock pulse results in a shift of the register contents to become 00000100. Following through with this operation, it will be found that in response to the eleventh, twelfth, thirteenth, fourteenth, and fifteenth pulses, the register contents become 00000010, then 00000001, then 00000000, then 00000000, and then 00000000. Thus all stages of the N–K register 54 register zero at the end of the application of the encoded word signal.

This will be the case if there is no error in the transmission of the encoded word signal, and under such circumstances, the stored information signal bits may be simply shifted out of the K-stage buffer register 46 through the conditional inverter 50 to the output line 18, by application of clock pulses on a line 47 from the timing circuit 48.

However, if an error is made in the transmission of the encoded word signal, a "1" will be registered in one or more stages of the N–K register 54. By way of example, if an error is made in the transmission of the first bit of the encoded word, i.e., if the received encoded word is 000100100100100, rather than 100100100100100, the contents of the N–K register 54 will change in accordance with the following table:

Table I

Encoded word=000100100100100 (first or left-hand bit in error)

| Time: | Decode register contents |
|---|---|
| Initial condition | 00000000 |
| 1st info entered | 00000000 |
| 2nd info entered | 00000000 |
| 3rd info entered | 00000000 |
| 4th info entered | 10000000 |
| 5th info entered | 11000000 |
| 6th info entered | 01100000 |
| 7th info entered | 00110000 |
| 8th info entered | 10011000 |
| 9th info entered | 01001100 |
| 10th info entered | 00100110 |
| 11th info entered | 00010011 |
| 12th info entered | 00001001 |
| 13th info entered | 00000100 |
| 14th info entered | 00000010 |
| 15th info entered | 00000001 |

Thus when there is an error in the first information bit received, the decode register contains the pattern 00000001 at the end of the reception of the complete encoded word. It is found that this error pattern is always produced in response to a single error in the first information bit, regardless of the information which is transmitted and the generator polynomial used. It is also found that the error patterns which must be recognized may be determined by assuming an all zero code vector was transmitted. In cyclic codes, when every information bit is zero, every redundant or check bit is also zero, and the errors can be represented by binary ones in the code word.

For example, if it is assumed that the 15, 7 code is used with feed-back connections from the SR–1, SR–5, SR–7 and SR–8 stages (as in the above examples), and if it is assumed that the received code word is 100000000000000 (the bits being received in order from left to right, and the first bit being in error as represented by the 1), the decode regiser will contain patterns according to the following table:

TABLE II.—SINGLE BIT ERROR PATTERNS

Encoded word=100000000000000 (first or left-hand bit in error)

| Time: | Decode register contents |
|---|---|
| Initial condition | 00000000 |
| 1st info entered | 10000000 |
| 2nd info entered | 11000000 |
| 3rd info entered | 01100000 |
| 4th info entered | 10110000 |
| 5th info entered | 01011000 |
| 6th info entered | 00101100 |
| 7th info entered | 00010110 |
| 8th info entered | 10001011 |
| 9th info entered | 01000101 |
| 10th info entered | 00100010 |
| 11th info entered | 00010001 |
| 12th info entered | 00001000 |
| 13th info entered | 00000100 |
| 14th info entered | 00000010 |
| 15th info entered | 00000001 |

Thus when there is an error in the first information bit-received, the decode register will contain the last pattern shown (00000001) at the end of the detection cycle, the same as in the first table above. If the second information bit is in error (010000000000000) the first zero bit entered has no effect on the contents of the decode register and the remaining fourteen shifts will provide the same patterns as the first fourteen shifts in the case of the error in the first bit. Therefore, at the end of the detection cycle for the second bit in error, the decode register will contain the second to the last pattern in the second table. It can thus be seen that the contents of the decode register at the end of each detection cycle for the fifteen possible single bit error conditions are given in the second table. It can be seen that if the decode register contains the first pattern in the second table and if it is shifted fourteen times with no additional information input, each shift would produce the consecutive patterns in the table and the last pattern would be produced by the fourteenth shift. It is a simple extension to state that all signal bit errors can be corrected as they leave the K-stage buffer or storage register 46, by merely detecting the 00000001 pattern since this pattern will occur as the bit in error enters the last stage of the K-stage buffer register 46, if both the decode register 54 and the K-stage buffer register are shifted simultaneously.

In the system of this invention, an error pattern generator 58 is provided which generates signals on output lines connected to a comparator circuit 59 to which output lines from the N–K decode register 54 are also connected. When the signal patterns applied to the comparator circuit 59 are identical, it applies a triggering signal to a flip-flop 60 having an output connectible through a switch 61 to the input of the conditional inverter 50.

For single bit error correction, while operating on the 15, 7 code for example, the error pattern generator 58 develops a 00000001 pattern on output lines thereof for comparison with output signals from the SR–8 through SR–1 stages of the decode register 54, respectively. If the received encoded word is 000100100100100 with the first or left-hand bit being in error (as in one of the foregoing examples), the contents of the decode register 54 will be 00000001 at the end of the detection cycle, the comparator circuit 59 will then develop an output signal to trigger the flip-flop 60, and the output of the flip-flop 60 may be applied through the switch 61 to the input of the conditional inverter 50. As the first bit is shifted out of the buffer register 46, it will be changed from a "0" to a "1." The flip-flop 60 may then be reset and in response to subsequent shifts of the decode register 54, the outputs of all active stages thereof will be zero, and no output signal will be developed by the comparator circuit 59. Accordingly, a corrected data output signal of 1001001 will be produced.

As another example, if the encoded word is

100000000000000 with the first or left-hand bit in error, the register contents will again be 00000001 at the end of the detection cycle, the comparator circuit 59 will again develop an output signal to trigger the flip-flop 60, to cause application of a signal to the conditional inverter 50 and as a first stored information bit is shifted out of the buffer register 46, it will be changed from a "1" to a "0.". With subsequent shifts of the decode register 54, the outputs of all stages of the register will be zero and the comparator circuit 54 will not develop an output signal. Accordingly, a corrected data signal of 0000000 will be produced on the output line 18.

As a third example, if the encoded word is

010000000000000 with the second bit being in error, the comparator circuit 59 will not produce an output signal at the end of the detection cycle, but will produce an output signal after the first information bit is transmitted out of the buffer register 46 and before the second bit is transferred therefrom. The second bit will then be corrected from a "1" to a "0," as in the second example above, to again produce a corrected data output signal of 0000000.

For correction of any two random errors, additional patterns must be recognized and the error pattern generator 58 of this invention provides the required patterns in a very simple and yet reliable manner, utilizing a small fraction of the circuitry that would be required by other types of error pattern recognition arrangements. The error pattern generator 58 is additionally effective for producing the patterns required for three bit random error corrections.

With reference to Table II, for all patterns that represent single errors not in the last digit, the last bit in the pattern can be inverted to provide the pattern for an error also in the last bit. Thus the patterns that must be recognized for any two random bits in error are shown in the following table:

TABLE III.—DOUBLE BIT ERROR PATTERNS

| Bits in error: | Decode register contents |
|---|---|
| 1st and 15th | 10000001 |
| 1st and 14th | 11000001 |
| 1st and 13th | 01100001 |
| 1st and 12th | 10110001 |
| 1st and 11th | 01011001 |
| 1st and 10th | 00101101 |
| 1st and 9th | 00010111 |
| 1st and 8th | 10001010 |
| 1st and 7th | 01000100 |
| 1st and 6th | 00100011 |
| 1st and 5th | 00010000 |
| 1st and 4th | 00001001 |
| 1st and 3rd | 00000101 |
| 1st and 2nd | 00000011 |

In accordance with this invention, the error pattern generator comprises a feed-back shift register 62, similar to the encoder and decoder shift registers 35 and 54 having eleven stages SR–1, through SR–11. In the illustrated system, the shift register 62 is connected to operate in a reverse order, signals being shifted from the SR–1 stage to the SR–2 stage, from the SR–2 to the SR–3, etc. Outputs of the stages of the shift register 62 are applied to the comparator circuit 59, but with the output of the SR–1 stage being of inverted form, a "1" signal being applied to the comparator when a "0" is stored in the SR–1 stage, and a "0" signal being applied to the comparator circuit when a "1" is stored in the SR–1 stage. Accordingly, in the reset condition, the register 62 provides the error pattern for a single error.

For generation of double and also triple error patterns, a conditional inverter 63 is disposed between the SR–1 and SR–2 stages and outputs of all stages are connectible through the feed-back switch 64 to a modulo-2 adder 65 having an output connected through a conditional inverter 66 to the input of the SR–1 stage. A control input of the conditional inverter 66 is connectible through a switch 67 to a line 68 which is connected to the control input of the conditional inverter 63.

With the register 62 being shifted in a direction opposite the direction of shifting of the register 54, and with the proper feed-back connections, the error pattern generator 62 will provide the patterns necessary for double error correction in a sequence opposite the sequence set forth in Table III.

The feed-back connections proper for this purpose are similar to those of the decode register 54, but with the inputs to the modulo-2 adder 65 moved by one stage opposite to the direction of shifting. By way of example, with a 15, 7 code and with feed-back connections from the SR–8, SR–7, SR–5 and SR–1 stages of the register 54, the feed-back connections are from the SR–8, SR–7, SR–6 and SR–4 stages of the register 62. When the code is such that a feed-back connection is required from the SR–1 stage to the modulo-2 adder 65, the conditional inverter 66 is rendered active by closing the switch 67.

By way of example, for double bit error correction with the 15, 7 code, and with feed-back connections from the SR–8, SR–7, SR–6 and SR–4 stages, the application of a control signal from line 68 to the conditional inverter 63 causes a "1" to be entered into the SR–2 stage of the register 62 in response to a first clock pulse after the register is in a reset condition. The register condition is then 00000010, and with the output of the SR–1 stage being inverted when applied to the comparator circuit 69, the error pattern is 00000011, which is the last pattern of Table III, required for detection of errors in the first and second bits. When a second clock pulse is applied, but with the control signal to the conditional inverter 63 removed, the register condition becomes 00000100, and with the output of the SR–1 stage being inverted to the comparator circuit 59, the error pattern is 00000101, which is the second to the last pattern of Table III, for detection of errors in the first and third bits. With subsequent clock pulses the other patterns of Table III are produced in reverse order.

Accordingly, the error patterns of Table III are generated by the "reverse" feed-back generator of the illustrated system, by first injecting a "1" in the first stage to provide the single error pattern, then shifting in reverse with fourteen clock pulses and inverting the output of the first stage to provide all the double error patterns.

For random triple error correction, the number of patterns that must be recognized is considerably greater. The number is equal to the total combinations of all random two bit errors not including the first bit in error in addition to the single and double error patterns. Expressed mathematically this becomes:

$$\binom{n-1}{2}+\binom{n-1}{1}+\binom{n-1}{0}$$

For the (23, 12) code this is:

$$\binom{22}{2}+\binom{22}{1}+\binom{22}{0}=254$$

The triple error patterns can also be generated by the "reverse" feed-back generator 62 of the illustrated system. This is accomplished by starting with every two bit error pattern and shifting until an error in the last bit of the word is represented. This is possible with continual application of clock pulses to the register 62 and with inversion signals being applied to the conditional inverter 63 at appropriate times.

In the illustrated system, the control line 68 for the conditional inverter 63 is connected to the output of a gate 70 having inputs respectively connected to outputs of O-gates 71 and 72 connected to a N counter 73 and a $N+1$ counter 74. A clock 75, which may be controlled from the timing circuit 48, supplies clock pulses to the shift register 62 and to the input of the N counter 73, and also through a delay circuit 76 to the $N+1$ counter 74, the delay circuit 76 being effective for obtaining an initial one clock pulse delay.

For resetting circuits at the end of a correction cycle, the gate 77 is provided having one input connected to the output of the gate 71 and having a second input connected to the output of a II-gate 78 which has inputs connected to outputs of the $N+1$ counter 74. The output of the gate 77 is arranged to reset all circuits of the generator 58.

To generate all triple, double and single bit error patterns, the generator 58 operates as follows. The N counter 73 and the $N+1$ counter 74 are both initially reset to the zero condition. In this state the O-gate 71 of the N counter provides an inversion signal through gate 70 on line 68. The first clock pulse will invert the signal into the SR–2 stage of the register 62, which represents an error in the second bit, and advances the counter 73 to the "1" condition. The first clock pulse is inhibited from the $N+1$ counter 74, by the delay circuit 76, and it remains in the zero state. The O-gate 72 of the $N+1$ counter 74 will then provide an inversion signal through gate 70 on the line 68 and at the next clock pulse, the input of the SR–1 stage is again inverted into the input of the SR–2 stage. In this condition, the generator 58 provides the error pattern for the first three bits in error. For the next $n-3$ clock pulses, no inversion signals are provided and the error patterns for all the double adjacent errors in combination with the first bit in error are generated. On the *n*th clock pulse, the register 62 is reset. On the $(n+1)$ *st* clock pulse, the O-gate 71 of the N counter 73 will again have an output and will invert the signal to the SR–2 stage and advance the N counter 73 to "1" and the $N+1$ counter 74 to "23." The $(n+2)$ *nd* clock pulse will advance the N counter 73 to "2" and the $N+1$ counter 74 to "0." An inversion signal will then be provided by the O-gate 72 and the next clock pulse will again invert the signal to the SR–2 stage. The generator now contains the error pattern for the first, second and fourth bits in error. The next $n-4$ clock pulses will generate the error patterns for all the double errors separated by one correct bit in combination with the first bit in error.

The register 62 is then reset again and the process is continued until the error patterns for two errors separated by $n-3$ correct bits in combination with the first bit are generated (*n*th, second, and first bits in error). The next clock pulse will then reset the N counter 73 to zero and the $N+1$ counter 74 to "2." This will cause an output of the gate 77 which triggers a reset generator (not shown) and causes all the circuits including the counters to be reset to the initial condition. This process generates the error patterns for all random two bits in error in combination with the first bit in error. Thus, all the required error patterns for random three bit error correction are produced.

As an example of the change in the contents of register 62 with successive shift pulses, the following table shows the register contents as produced at representative points of a complete error correction cycle, while operating with a 23, 12 code (the 15, 7 code used in foregoing examples is not suitable for three bit error correction).

TABLE IV.—THREE BIT ERROR CORRECTION

| Decode Shift Pulse | $n$ Counter | $n+1$ Counter | Remarks | Register Contents |
|---|---|---|---|---|
| Reset | 0 | 0 | Reset | 00000000000 |
| 1 | 1 | 0 | Inversion | 00000000011 |
| 2 | 2 | 1 | do | 00000000100 |
| 3 | 3 | 2 | | 00000001000 |
| 4 | 4 | 3 | | 00000010000 |
| 22 | 22 | 21 | | 11000000000 |
| 23 | 0 | 22 | Reset | 00000000000 |
| 24 | 1 | 23 | Inversion | 00000000011 |
| 25 | 2 | 0 | | 00000000111 |
| 26 | 3 | 1 | Inversion | 00000001100 |
| 27 | 4 | 2 | | 00000011000 |
| 45 | 22 | 20 | | 00100000000 |
| 46 | 0 | 21 | Reset | 00000000000 |
| 47 | 1 | 22 | Inversion | 00000000011 |
| 48 | 2 | 23 | | 00000000111 |
| 49 | 3 | 0 | | 00000001111 |
| 50 | 3 | 1 | Inversion | 00000011100 |
| 51 | 5 | 2 | | 00000111001 |
| 68 | 22 | 19 | | 11010000000 |
| 69 | 0 | 20 | Reset | 00000000000 |
| 70 | 1 | 21 | Inversion | 00000000011 |
| 71 | 2 | 22 | | 00000000111 |
| 72 | 3 | 23 | | 00000001111 |
| 73 | 4 | 0 | | 00000011111 |
| 74 | 5 | 1 | Inversion | 00000111101 |
| 75 | 6 | 2 | | 00001111011 |
| 479 | 19 | 22 | | 01010000000 |
| 480 | 20 | 23 | | 10100000000 |
| 481 | 21 | 0 | | 01000000000 |
| 482 | 22 | 1 | Inversion | 10000000011 |
| 483 | 0 | 2 | Correction | 00000000000 |

The illustrated sysem is also usable for burst error correction and for this purpose, a $n-k-b$ detector 80 is provided having inputs connected to outputs of the $n-k$ register 54. The detector 80 detects the all zero patterns in the $n-k-b$ stages of the register 54, starting from the left stage in the register. The output of detector 80 is applied through a switch 81 to a gate 82 connected to the output of the modulo-2 adder 36. The correction signal, for a burst of *b* errors or less, is fed from the output of a modulo-2 adder 36 to the conditional inverters 50 and 57 through the gate 82. Each bit in error is corrected as it leaves the buffer register 46, as was the case in the random error correction mode.

It is noted that the system of this invention is usable with a shortened cyclic code. A cyclic $(n, k)$ code word can be shortened by reducing the number of information bits while retaining the same number of check bits. The new code $(n-c, k-c)$ where *c* is at least equal to one and less than *k*, is called a shortened cyclic code and retains the error detection and correction capability of the original code. The generator polynomial is identical and the same feed-back connection is therefore used in the encoder and decoder registers as in the nonshortened code. The error pattern generator is also identical. The illustrated system is capable of decoding codes shortened by one bit $(c=1)$. It may also be noted that information may be transmitted to and from the encoder 11 and decoder 17 in parallel as well as in series, by providing suitable storage registers.

As above indicated, feed-back connections from the SR–8, SR–7, SR–5 and SR–1 stages of the encoder shift register 35 or the decoder shift register 54 to the corresponding second modulo-2 adder 39 or 56 may be provided for the 15, 7 code. For the 23, 12 code, the feed-back connections may be made from the SR–10, SR–8, SR–7, SR–6, SR–2 and SR–1 stages. For a 17, 9 code, the feed-back connections may be from the SR–8, SR–7, SR–5, SR–3, SR–2 and SR–1 stages. For a 16, 8 shortened cyclic code, the feed-back connections may be the same as for the 17, 9 code. For a 15, 11 code and also for a 7, 4 code, feed-back connections may be made from the SR–2 and SR–1 stages.

It will be understood that modifications and variations may be effected without departing from the spirit and scope of the novel concepts of this invention.

We claim:

1. In a cyclic decoder including decoder means for producing certain patterns in response to errors in a received encoded word including a plurality of pulse bits received in sequence, shift register means including linear-logic feedback means for generating error patterns required for cyclic code error correction, a comparison circuit for comparing the pattern produced by said decoder means and the pattern produced by said shift register means, and correcting means for feeding out the individual bits in sequence, said correcting means being coupled to said comparison circuit and responsive thereto for correcting each bit representing an error.

2. In a cyclic decoder, a decode register having a plurality of stages, means for applying clock pulses to said stages to shift signals serially from one stage to another, means for applying a sequence of pulse bits representing a received encoded word to said decode register, first feedback switch means connected to certain stages of said decode register to apply feedback signals to said register, an error pattern shift register having a plurality of stages, means for applying clock pulses to said stages to shift signals from one stage to another, second feedback switch means connected to certain stages of said error pattern register to apply feedback signals to said register and to cause said register to develop patterns of a form and sequence corresponding to the feedback connections of said decode register, means for comparing the pattern produced by said decode shift register and the pattern produced by said error pattern feedback register, and correcting means for feeding out the individual bits of the word in sequences, said correcting means being coupled to said comparing means and responsive thereto for correcting each bit representing an error.

3. In a cyclic decoder, a decode register having a plurality of stages, means for applying clock pulses to said stages to shift signals serially from one stage to another, means for applying a received encoded word to said decode register, first feedback switch means connected to certain stages of said decode register to apply feedback signals to said register, an error pattern shift register having a plurality of stages, means for applying clock pulses to said stages to shift signals from one stage to another, means including at least one conditional inverter connected between stages of said error pattern register, second feedback switch means connected to certain stages of said error pattern register for applying feedback signals to said register to cause said register to develop patterns of a form and sequence corresponding to the feedback connections of said decode register, and means for comparing the pattern produced by said decode shift register and the pattern produced by said error pattern feedback register.

4. In a cyclic decoder, a decode register having a plurality of stages, means for applying a sequence of pulse bits representing a received encoded word to said decode register, means for applying clock pulses to said stages to shift signals serially from one stage to another and to cause generation of certain patterns in response to errors in a received encoded word, an error pattern shift register having a plurality of stages, means for applying clock pulses to said stages of said error pattern shift register for causing said register to produce error patterns required for cyclic code error correction, and counter means responsive to clock pulses applied to said error pattern shift register for controlling cyclic operation thereof, a comparison circuit for comparing the pattern produced by said decode shift register and the pattern produced by said error pattern shift register, and correcting means for feeding out the individual bits of the word in sequences, said correcting means being coupled to said comparing means and responsive thereto for correcting each bit representing an error.

5. In a cyclic decoder for receiving an encoded word of $n$ bits composed of $k$ information bits representing coefficients of a message polynomial in $x$ of degree less than $k$ and $n-k$ check bits representing a remainder after division of the product of $x^{n-k}$ and the message polynomial by a generator polynomial of degree $n-k$, comprising: a decode shift register having $n-k$ stages, means for applying bits representing a received encoded word signal to said decode shift register, feedback means connected to certain stages of said decode register for applying feedback signals to said register to effect division of said encoded word by said generator polynomial to produce one pattern of outputs from said stages with no errors in the received encoded word signal and to produce other patterns in response to errors in the received encoded word signal, and error pattern generator means including an error pattern shift register having $n-k$ stages and cyclically operable to produce predetermined error patterns of output signals from said stages in a predetermined sequence, comparison circuit means for comparing output signals from said decode shift register with output signals from said error pattern generator shift register to detect errors in a received encoded word, and correcting means for feeding out the individual information bits of the word sequences, said correcting means being coupled to said comparing means and responsive thereto for correcting each information bit representing an error.

6. In a cyclic encoder-decoder system, an encoder for responding to input information to produce an encoded word composed of $k$ information bits representing coefficients of a message polynomial in $x$ of degree less than $k$ and $n-k$ check bits representing a remainder after division of the product of $x^{n-k}$ and the message polynomial by a generator polynomial of degree $n-k$, said encoder comprising a register having $n-k$ stages, means for serially applying said $k$ information bits to said register while applying shift pulses to said stages, feedback means connected to certain stages of said register for applying feedback signals to said register in accordance with the generator polynomial, means for applying continued shift pulses to said stages after application of said information bits to generate said check bits, and a decoder for receiving an encoded word and comprising a decode shift register having $n-k$ stages, means for serially applying bits representing a received encoded word to said decode register, feedback means substantially the same as said feedback means of said encoder connected to certain stages of said decode register for applying feedback signals to said decode register in accordance with said generator polynomial to produce certain error patterns after application of $n$ bits, and error pattern generating means including a shift register operable through a cycle for producing predetermined error patterns in a predetermined sequence, comparison circuit means for comparing output signals from said decode shift register stages with output signals from said error pattern generator to detect errors in a received encoded word, and connecting means for feeding out the individual information bits of the word in sequences, said correcting means being connected to said comparison circuit means and responsive thereto for correcting each information bit representing an error.

7. In a cyclic decoder, a buffer storage register for storing pulse bits representing the information portion of a received encoded word, a decode shift register for producing certain patterns in response to errors in a received encoded word, a linear-logic feedback register for generating error patterns required for cyclic code error correction, a comparison circuit for comparing the pattern produced by said decode shift register and the pattern produced by said linear-logic feedback register, and means coupled to said buffer storage register for feeding the stored information portion of an encoded word out of said buffer storage register, said last named means including a conditional inverter responsive to an output from said comparison circuit.

8. In a cyclic decoder, a decode register including a first stage, a plurality of intermediate stages and a last stage, means for applying clock pulses to said stages to shift signals from one stage to another towards said first stage, means for serially applying bits representing a received encoded word to said last stage, feedback means connected to certain of said stages to apply feedback signals to said last stage and to cause generation of certain patterns of output signals from said stages in response to possible errors in said received encoded word signal, an error pattern register including a first stage, a plurality of intermediate stages and a last stage, means for applying clock pulses to said stages of said error pattern register to shift signals toward said last stage, feedback means connected to certain of said stages of said error pattern register for applying feedback signals to said first stage of said error pattern generator and to cause generation of certain patterns of output signals from said stages of said error pattern register, and a comparison circuit for comparing respectively the output signals from said first, intermediate and final stages of said decode register and said first, intermediate and final stages of said error pattern generator.

9. In a cyclic decoder, a decode register having a plurality of stages, means for applying clock pulses to said stages to shift signals serially from one stage to another, means for applying bits representing a received encoded word signal to said decode register, feedback means coupled to certain stages of said decode register for applying feedback signals to said decode register to cause generation of certain patterns of output signals from said stages in response to possible errors in said received encoded word signal, an error pattern shift register having the same number of stages as said decode register, means for applying clock pulses to said stages of said error pattern shift register, feedback means coupled to certain stages of said error pattern register for applying feedback signals to said error pattern register to cause generation of certain patterns of output signals from said stages of said error pattern register, a comparison circuit, means for applying signals from said stages of said decode register to said comparison circuit, and means including at least one inverter for applying signals from said stages of said error pattern register to said comparison circuit, said comparison circuit being operable to develop an output signal when the signals applied thereto are the same.

10. A cyclic decoder in accordance with claim 7 wherein the pulse bits are individually fed out through the conditional inverter and are corrected thereby in accordance with the output of said comparison circuit.

11. In a cyclic decoder, an error pattern register including the first stage, a plurality of intermediate stages and a last stage, means for applying clock pulses to said stages of said error pattern register to shift signals toward said last stage, and feedback means connected to certain of said stages for applying feedback signals to said first stage and to cause generation of certain patterns of output signals from said stages, the output of said first stage being inverted with respect to the outputs of said intermediate and last stages to generate the single bit error pattern in a reset condition of said register.

12. In a cyclic decoder, an error pattern register including the first stage, a plurality of intermediate stages and a last stage, means for applying clock pulses to said stages of said error pattern register to shift signals toward last stage, a conditional inverter between said first stage and the intermediate stage adjacent thereto, feedback means connected to certain of said stages for applying feedback signals to said first stage, and means for controlling said conditional inverter while applying said clock pulses to said stages to cause generation of all double bit error patterns in a cycle of operation of said register.

13. In a cyclic decoder, an error pattern register including the first stage, a plurality of intermediate stages and a last stage, means for applying clock pulses to said stages of said error pattern register to shift signals toward said last stage, a conditional inverter between said first stage and the intermediate stage adjacent thereto, feedback means connected to certain of said stages for applying feedback signals to said first stage, the output of said first stage being inverted with respect to the outputs of the remaining stages to generate a single bit error pattern in a reset condition of said register, means for effecting inversion operation of said conditional inverter while applying first and second clock pulses to said stages, and means for effecting non-inversion operation of said conditional inverter while applying additional clock pulses to said stages, for generation of triple bit error patterns.

14. In a cyclic decoder for receiving an encoded word of $n$ bits composed of $k$ information bits representing coefficients of a message polynomial in $x$ of degree less than $k$ and $n-k$ check bits representing a remainder after division of the product of $x^{n-k}$ and the message polynomial by a generator polynomial of degree $n-k$, an error pattern generator comprising a shift register having $n-k$ stages, means for applying clock pulses to said shift register, feedback means connected to certain of said stages for applying signals to a first stage of said register and to cause generation of certain patterns of output signals from said stages in response to said clock pulses, and means including an $n$ counter for responding to clock pulses and controlling the operation of said register.

15. In a cyclic decoder for receiving an encoded word of $n$ bits composed of $k$ information bits representing coefficients of a message polynomial in $x$ of degree less than $k$ and $n-k$ check bits representing a remainder after division of the product of $x^{n-k}$ and the message polynomial by a generator polynomial of degree $n-k$, an error pattern generator comprising a shift register having $n-k$ stages, means for applying clock pulses to said shift register, feedback means connected to certain of said stages for applying signals to a first stage of said register and to cause generation of certain patterns of output signals from said stages in response to said clock pulses, and means including an $n$ counter and a $n+1$ counter for responding to said clock pulses and controlling the operation of said register.

References Cited

UNITED STATES PATENTS

| | | | |
|---|---|---|---|
| 3,069,657 | 12/1962 | Green et al. | 340—171 |
| 3,123,803 | 3/1964 | De Lisle et al. | 340—146.1 |
| 3,162,837 | 12/1964 | Meggitt | 340—146.1 |
| 3,163,848 | 12/1964 | Abramson | 340—146.1 |
| 3,222,643 | 12/1965 | Klinkhamer | 340—146.1 |

MALCOLM A. MORRISON, *Primary Examiner.*

C. E. ATKINSON, *Assistant Examiner.*